(12) United States Patent
Schlotterer et al.

(10) Patent No.: US 7,686,375 B1
(45) Date of Patent: Mar. 30, 2010

(54) VEHICLE WINDOW SUNSHADE ASSEMBLY

(75) Inventors: Kelly Schlotterer, Commerce Township, MI (US); David She, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/270,436

(22) Filed: Nov. 13, 2008

(51) Int. Cl.
*B60J 3/02* (2006.01)
*B60J 1/20* (2006.01)

(52) U.S. Cl. .................... 296/97.8; 296/97.4; 296/97.9; 160/DIG. 3; 160/370.22

(58) Field of Classification Search ............... 296/97.4, 296/97.8, 97.9; 160/DIG. 2, DIG. 3, 370.22, 160/370.21
See application file for complete search history.

(56) References Cited

U.S. PATENT DOCUMENTS

| | | | |
|---|---|---|---|
| 4,836,263 A | 6/1989 | Ament | |
| 5,033,527 A * | 7/1991 | Ouvrard et al. | 160/310 |
| 5,468,040 A * | 11/1995 | Hsieh et al. | 296/97.4 |
| 6,189,948 B1 | 2/2001 | Lin | |
| 6,216,762 B1 | 4/2001 | Lin | |
| 6,427,751 B1 | 8/2002 | Schlecht et al. | |
| 6,695,381 B2 * | 2/2004 | Schlecht et al. | 296/97.4 |
| 6,796,599 B2 | 9/2004 | Schlecht et al. | |
| 7,014,243 B2 | 3/2006 | Nakajo | |
| 7,089,992 B2 | 8/2006 | Walter et al. | |
| 2003/0066615 A1 * | 4/2003 | Bong | 160/370.22 |
| 2004/0040672 A1 | 3/2004 | Nagar | |
| 2005/0092449 A1 | 5/2005 | Weinbrenner et al. | |
| 2005/0257903 A1 * | 11/2005 | Schimko et al. | 160/370.22 |
| 2005/0275239 A1 * | 12/2005 | Nakajo | 296/97.4 |
| 2006/0065375 A1 * | 3/2006 | Chen | 160/370.22 |
| 2007/0095489 A1 * | 5/2007 | Thumm et al. | 160/370.22 |

FOREIGN PATENT DOCUMENTS

DE 10351040 B3 5/2005
JP 2006-103598 A 4/2006

* cited by examiner

*Primary Examiner*—Jason S Morrow
(74) *Attorney, Agent, or Firm*—Global IP Counselors, LLP (57) ABSTRACT

A vehicle window sunshade assembly includes a vehicle structure, a trim member, a sunshade and a close-out member. The trim member is dimensioned to at least partially cover the vehicle structure. The trim member also has a sunshade opening and attachment portions for coupling to the vehicle structure. The sunshade has an end supported by the vehicle structure. The sunshade is movable between a retracted position and an extended position such that in the extended position at least a portion of the sunshade extends through the sunshade opening. The close-out member is supported by the vehicle structure and positioned such that with the trim member installed to the vehicle structure the close-out member extends generally around the end of the sunshade to conceal an area behind the end of the sunshade from view through the sunshade opening.

19 Claims, 9 Drawing Sheets

VEHICLE WINDOW SUNSHADE ASSEMBLY

BACKGROUND OF THE INVENTION

1. Field of the Invention

The present invention relates to a vehicle window sunshade assembly. More specifically, the present invention relates to a sunshade assembly that includes a close-out member that conceals components of the sunshade assembly with the sunshade in an extended position.

2. Background Information

Many vehicles include window sunshade assemblies installed beneath a trim member, where the trim member has an opening or slot. The trim member typically is part of or defines a portion of a parcel shelf (or P-shelf) adjacent a rear window of the vehicle. The sunshade assembly and the trim member are installed to a P-shelf support structure that is typically made of structural material, such as sheet metal. A sunshade of the sunshade assembly is movable between a retracted position and an extended position. In the retracted position, the sunshade, the sunshade assembly and the P-shelf support structure are generally hidden from view. In the extended position, the sunshade extends out through the opening or slot in the trim member and covers an interior surface of the rear window. Further, in the extended position, portions of the P-shelf support structure are visible and unless painted or otherwise decorated, the P-shelf support structure is unattractive.

In view of the above, it will be apparent to those skilled in the art from this disclosure that there exists a need for an improved sunshade assembly that has a more attractive appearance when the sunshade is in the extended position. This invention addresses this need in the art as well as other needs, which will become apparent to those skilled in the art from this disclosure.

SUMMARY OF THE INVENTION

It has been discovered that when the sunshade is in the extended position, unattractive portions of a P-shelf support structure are visible through the opening or slot in a corresponding trim member.

One object of the present invention is to provide a sunshade assembly with a more attractive appearance with the sunshade in the extended position.

Another object of the present invention is to provide the rear of a passenger compartment that includes a sunshade assembly with additional sound dampening capabilities.

In accordance with one aspect of the invention, a vehicle window sunshade assembly includes a vehicle structure, a trim member, a sunshade and a close-out member. The trim member is dimensioned to at least partially cover the vehicle structure. The trim member also has a sunshade opening and attachment portions for coupling to the vehicle structure. The sunshade has an end supported by the vehicle structure. The sunshade is movable between a retracted position and an extended position such that in the extended position at least a portion of the sunshade extends through the sunshade opening. The close-out member is supported by the vehicle structure and positioned such that with the trim member installed to the vehicle structure the close-out member extends generally around the end of the sunshade to conceal an area behind the end of the sunshade from view through the sunshade opening.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
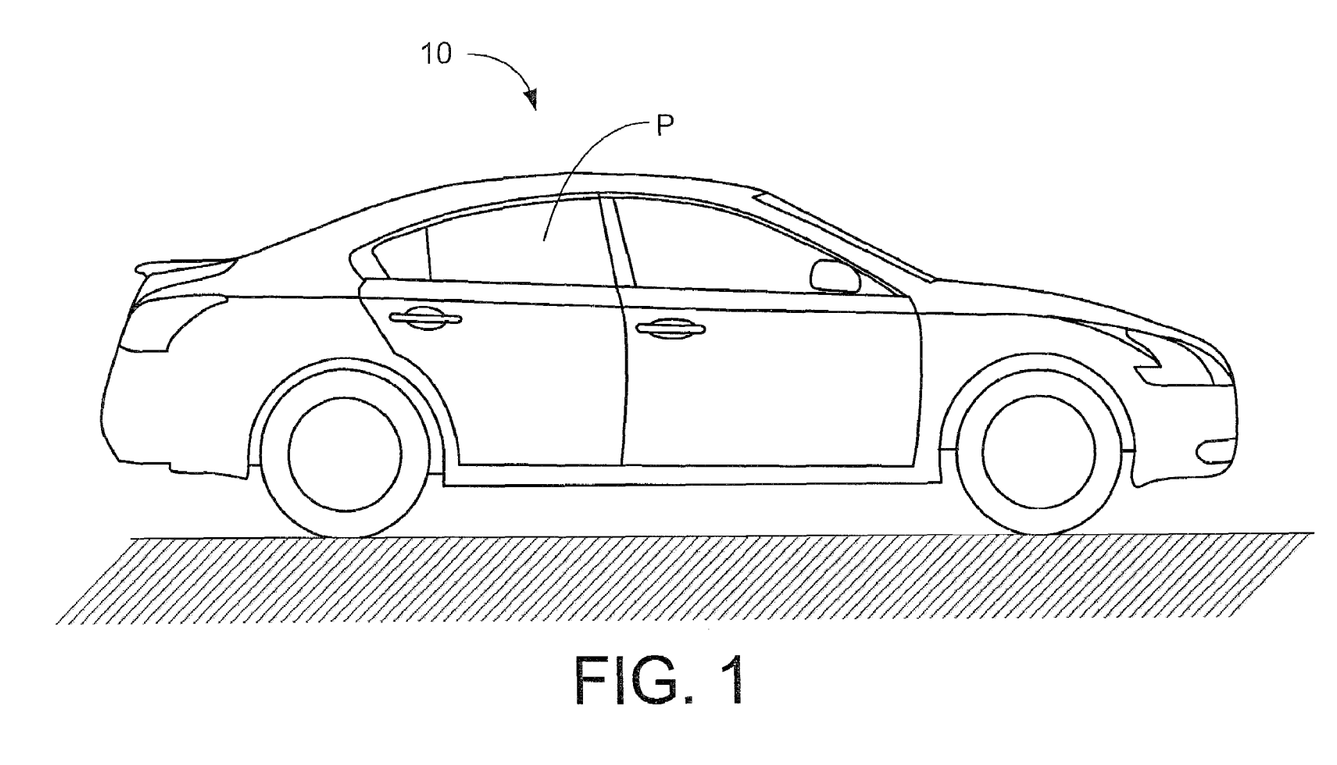
FIG. 1 is a side elevational view of a vehicle that includes a sunshade assembly in accordance with the present invention.
Figure 2:
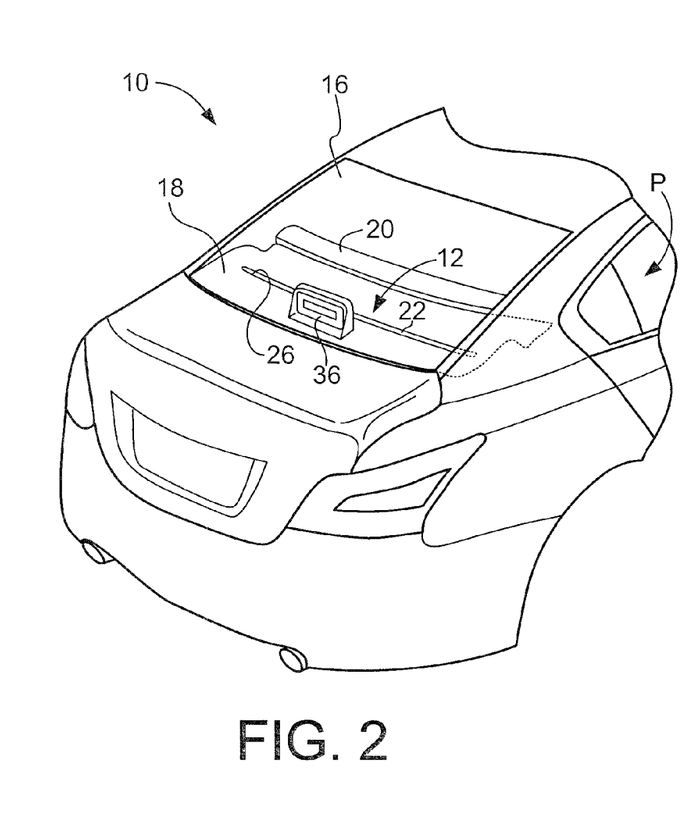
FIG. 2 is a rear perspective view of the vehicle showing a rear window, a trim member that at least partially defines a P-shelf beneath the rear window within the vehicle and a slot in the trim member, with a sunshade assembly hidden beneath the trim member in a retracted position in accordance with the present invention.
Figure 3:
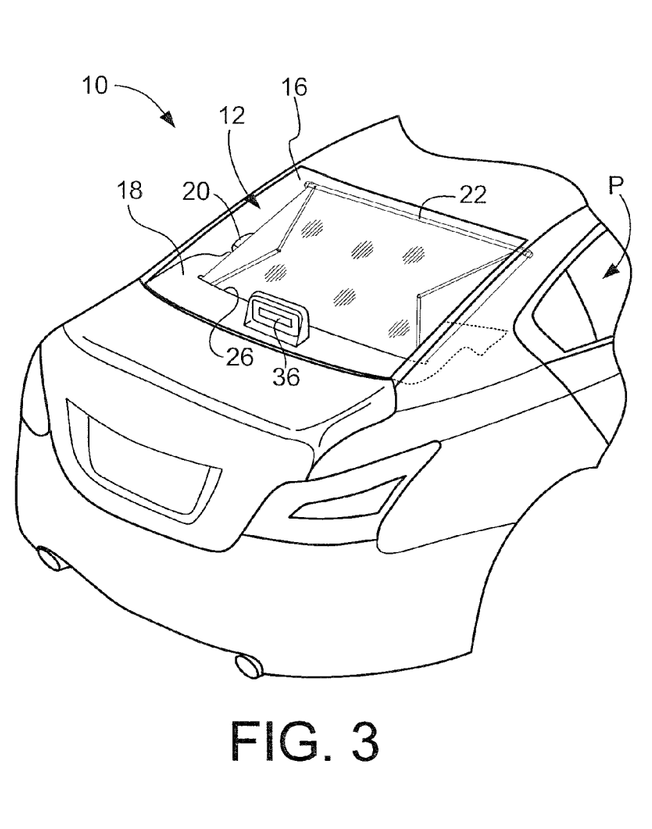
FIG. 3 is another rear perspective view of the vehicle similar to FIG. 2 showing a sunshade of the sunshade assembly extending through the slot in the trim member in a partially extended position in accordance with the present invention.

Referring initially to FIG. 1, a vehicle 10 with a passenger compartment P is illustrated in accordance with a first embodiment of the present invention. As shown in FIGS. 2 and 3, the vehicle 10 includes a sunshade assembly 12 that is extendable between a retracted position (FIG. 2) and an extended position (FIG. 3) within the passenger compartment P. The sunshade assembly 12 includes a close-out member 14 that is shown in FIGS. 5-10 and described in greater detail below. The close-out member 14 is dimensioned and shaped to obscure or hide various portions of the vehicle under or behind the sunshade assembly 12 with the sunshade assembly 12 in the extended position, as described in greater detail below.

As shown in FIGS. 2 and 3, the vehicle 10 includes, among other things, a rear window 16, a trim member 18, a rear seat 20, a P-shelf support structure 21 (shown only in FIGS. 9 and 10) and the sunshade assembly 12, all within the passenger compartment P. The trim member 18 is supported within the passenger compartment P by the P-shelf support structure 21 of the vehicle 10. It should be understood from the drawings and description herein that the P-shelf support structure 21 is a conventional part of the basic vehicle structure that extends between adjacent a lower edge of the rear window 16 and the rear seat 20.

The trim member 18 is dimensioned and shaped to at least partially conceal portions of the sunshade assembly 12 and the P-shelf support structure 21. However, as shown in FIGS. 2 and 3, portions of the sunshade assembly 12 are visible at and above the upper surface of the trim member 18, as described in greater detail below.

Specifically, in FIG. 2, the sunshade assembly 12 is depicted in a retracted position and therefore only an end piece 22 of the sunshade assembly 12 is visible. In FIG. 3, a sunshade 24 of the sunshade assembly 12 is in an extended position such that the sunshade 24 extends out of an opening or slot 26 of the trim member 18 and at least partially covers an interior surface of the rear window 16 of the vehicle 10. The sunshade 24 of the sunshade assembly 12 is movable between the retracted position and the extended position, as well as intermediate positions between the retracted position and the extended position.

Figure 4:
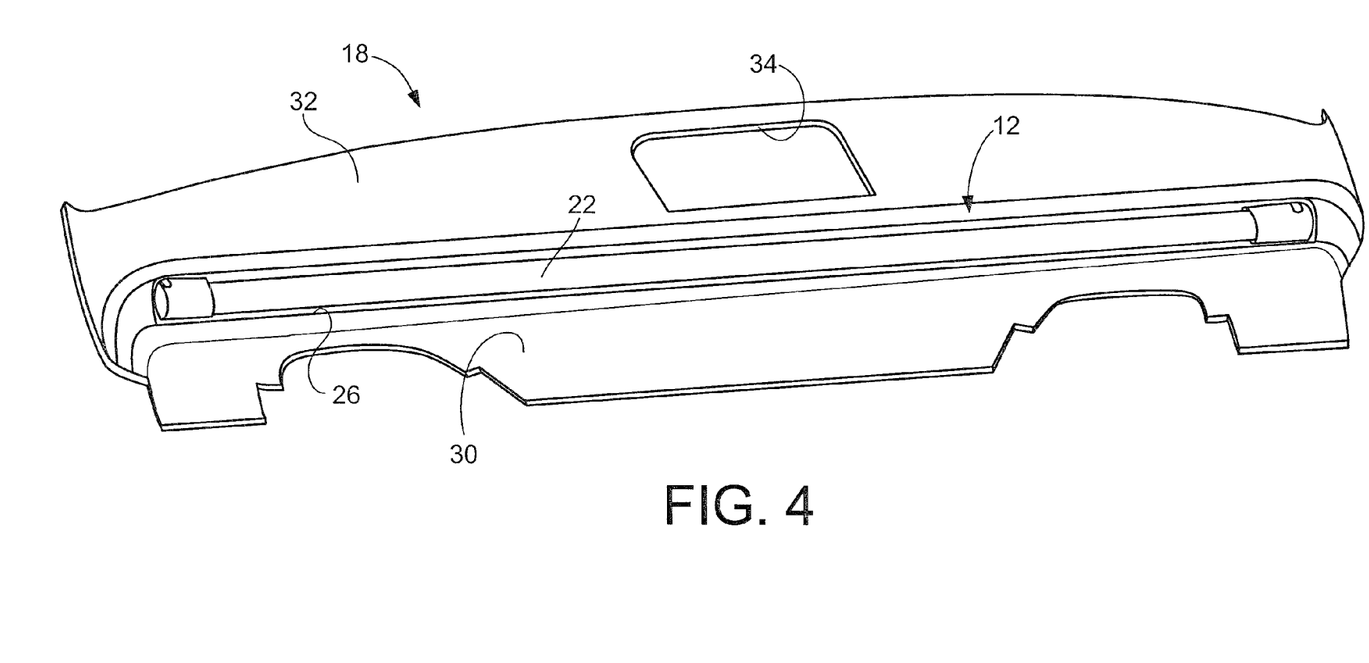
FIG. 4 is a perspective view of the trim member shown removed from the vehicle, showing an end piece of the sunshade assembly visible through the slot in the trim member and a portion of a close-out member also visible through the slot in the trim member in accordance with the present invention.

Referring now to FIG. 4, a description of the trim member 18 is now provided. The trim member 18 is shown removed from the vehicle 10 in FIG. 4. However, the trim member 18 is configured to be installed in a conventional manner on the P-shelf support structure 21 (FIGS. 9 and 10) and the sunshade assembly 12 within the passenger compartment P of the vehicle 10 beneath the rear window 16. The trim member 18 is dimensioned and shaped to define the P-shelf between the rear window 16 and the rear seat 20. Since the rear window 16, the P-shelf support structure 21 and the rear seat 20 and other components of the passenger compartment P are conventional elements, description thereof is omitted for the sake of brevity.

Figure 9:
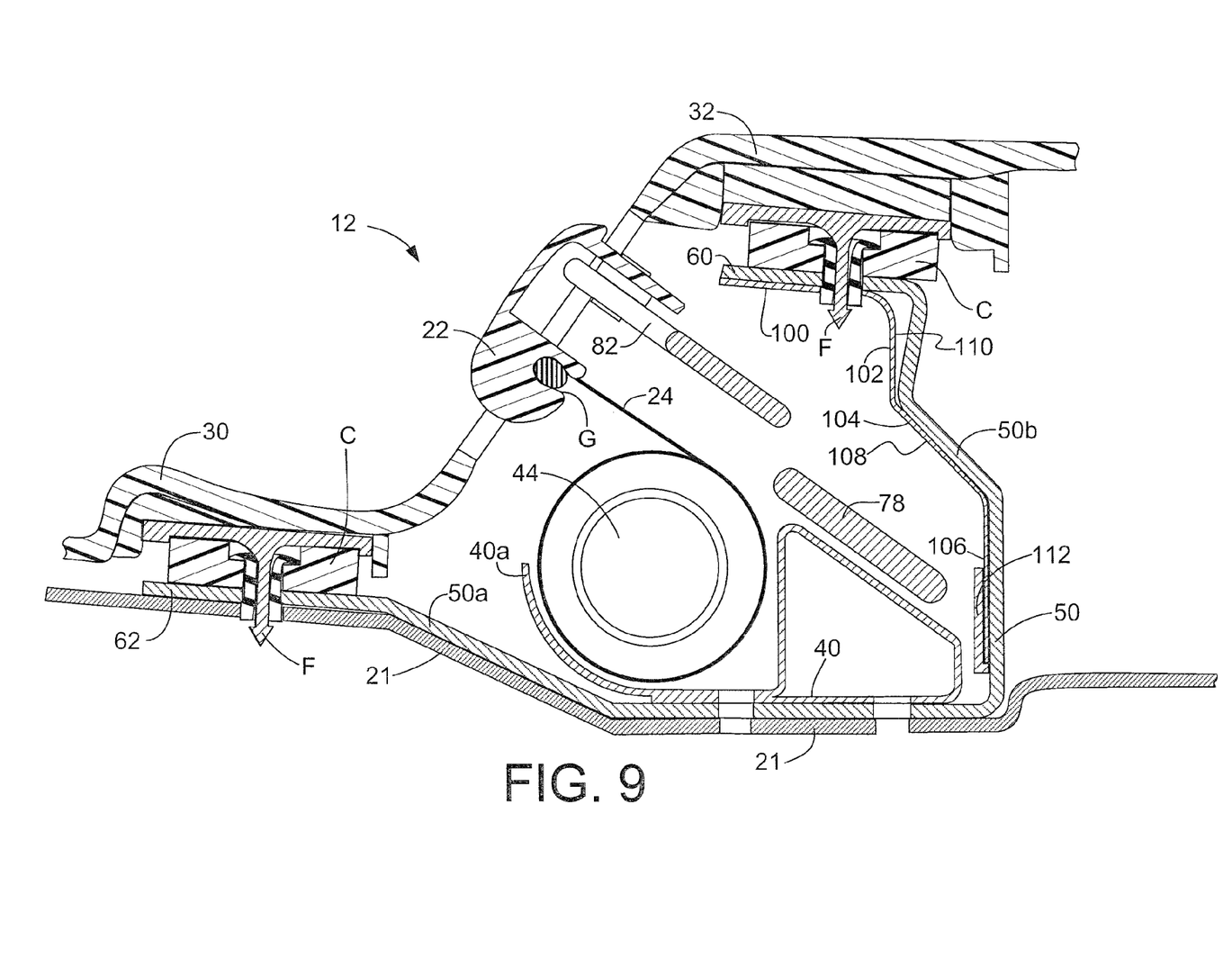
FIG. 9 is a cross-sectional view of the sunshade assembly taken along the line 9-9 in FIG. 7 showing the sunshade in the retracted position in accordance with the present invention.
Figure 10:
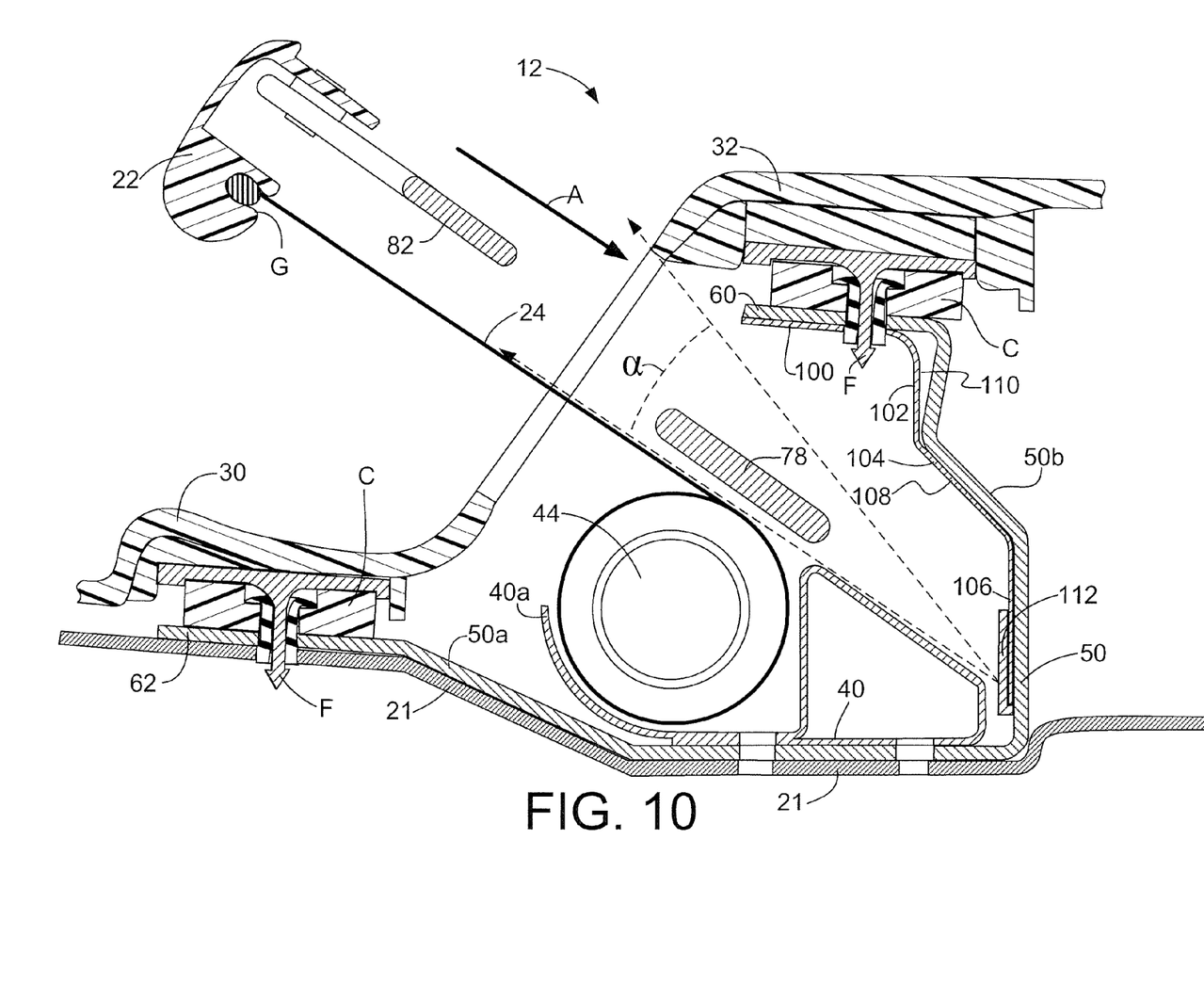
FIG. 10 is a cross-sectional view of the sunshade assembly similar to FIG. 9 but showing the sunshade in a partially extended position in accordance with the present invention.

The trim member 18 includes a front portion 30 and a rear portion 32 that are horizontally offset from one another, as best shown in FIGS. 9 and 10. Specifically, the front portion 30 of the trim member 18 is lower than the rear portion 32. With reference again to FIG. 4, the rear portion 32 includes a central opening 34 that is dimensioned to receive a conventional brake light assembly 36 that is shown only in FIGS. 2 and 3. The trim member 18 also includes the slot 26 formed between the front portion 30 and the rear portion 32. The slot 26 is an elongated opening that is dimensioned such that the sunshade 24 of the sunshade assembly 12 can easily extend in and out of the slot 26. As shown in FIGS. 9 and 10, the trim member 18 also includes a plurality of the fastening elements F that are configured for attachment to the sunshade assembly 12 and the P-shelf support structure 21, as described in greater detail below.

Figure 5:
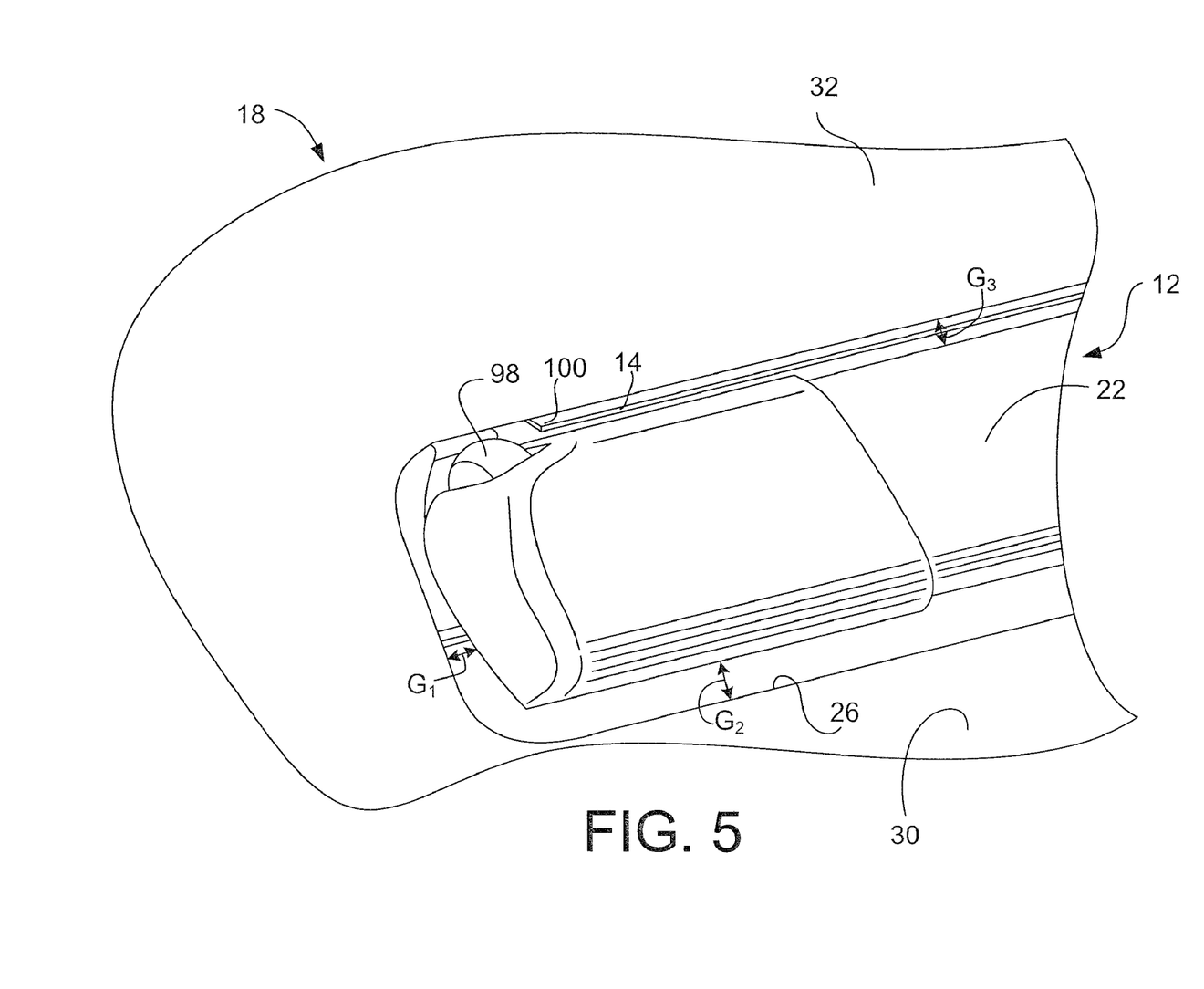
FIG. 5 is a perspective view of the trim member similar to FIG. 4, but with an enlarged scale, showing the end piece of the sunshade assembly visible through the slot in the trim member and a portion of a close-out member also visible through the slot in the trim member in accordance with the present invention.

As indicated in FIGS. 4 and 5 and shown in FIGS. 9 and 10, the sunshade assembly 12 is basically concealed under the trim member 18 except that with the sunshade 24 in the retracted position, the end piece 22 is visible in the slot 26 of the trim member 18. With the sunshade 24 in the extended position or in various intermediate positions between the retracted position and the extended position, the sunshade 24 and the end piece 22 are visible above the trim member 18.

As best shown in FIG. 5, the slot 26 is also dimensioned such that with the sunshade 24 in the retracted position, the end piece 22 fits within the slot 26. Preferably, small gaps are formed between the end piece 22 and the surfaces of the trim member 18 that define the slot 26. Specifically, as shown in FIG. 5, a gap $G_1$ is formed between lateral ends of the slot 26 and the end piece 22 (only one lateral end of the slot 26 is depicted in FIG. 5). Further, a gap $G_2$ is formed between a forward edge of the slot 26 and a forward edge of the end piece 22 of the sunshade assembly 12. As well, a gap $G_3$ is formed between a rearward edge of the slot 26 and a rearward edge of the end piece 22 of the sunshade assembly 12. The gaps $G_1$, $G_2$ and $G_3$ are sufficiently small such that very little of the sunshade assembly 12 besides the end piece 22 can be viewed through any of the gaps $G_1$, $G_2$ and $G_3$.

A description of the sunshade assembly 12 is now provided with specific reference to FIGS. 4-10. The sunshade assembly 12 is depicted as a motor powered mechanism. However, it should be understood from the drawings and the description herein that the sunshade assembly 12 can also be configured as a manually operated mechanism without motor power.

As indicated in FIGS. 9 and 10, the sunshade assembly 12 is installed to the P-shelf support structure 21 in a conventional manner. The sunshade assembly 12 extends laterally between opposite sides of the vehicle 10 along the P-shelf support structure 21 such that the end piece 22 extends into the slot 26, as shown in FIGS. 2, 4 and 5.

As best shown in FIGS. 6-10, the sunshade assembly 12 basically includes a lower frame member 40, a pair of spool supports 42 (only one spool support shown in each of FIGS. 6, 7 and 8), a spool 44 (FIGS. 9 and 10 only), first attachment brackets 46 (FIG. 6), a second attachment bracket 48 (FIGS. 7 and 8), a plurality of ribs 50, a sunshade moving mechanism 52 (FIGS. 6-8), the end piece 22, the sunshade 24 (FIGS. 8-10) and the close-out member 14.

As indicated in FIGS. 6-10, the lower frame member 40 is basically a contoured elongated member that extends from end to end along the entire vehicle lateral length of the sunshade assembly 12. Although the lower frame member 40 is depicted as a molded sheet metal-like member, it can alternatively be formed of molded plastic or polymer material. As shown in cross-section in FIGS. 9 and 10, the lower frame member 40 includes a curved portion 40a that extends part way around the spool 44.

Figure 6:
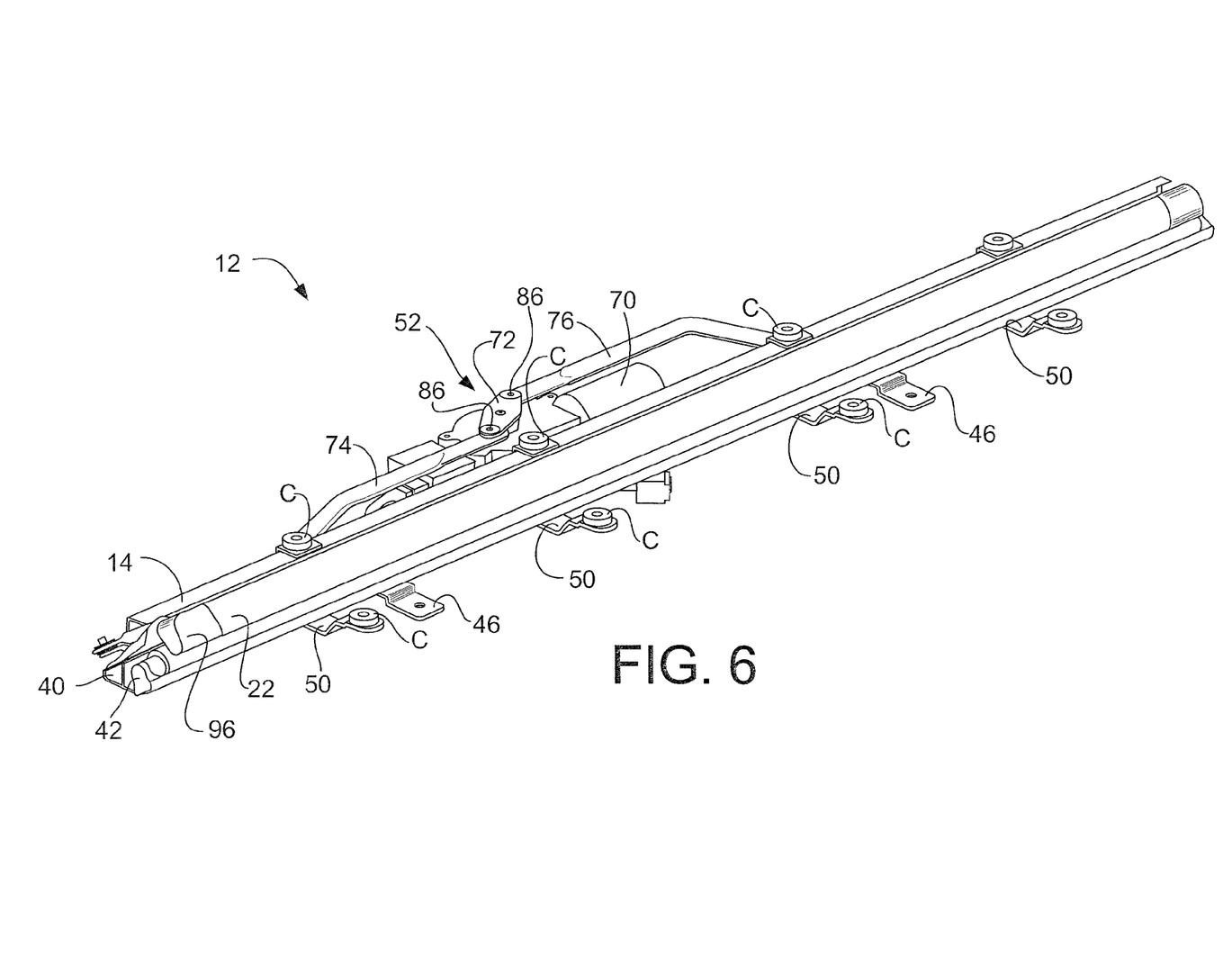
FIG. 6 is a perspective view of the sunshade assembly shown removed from the vehicle with the sunshade in the retracted position in accordance with the present invention.
Figure 7:
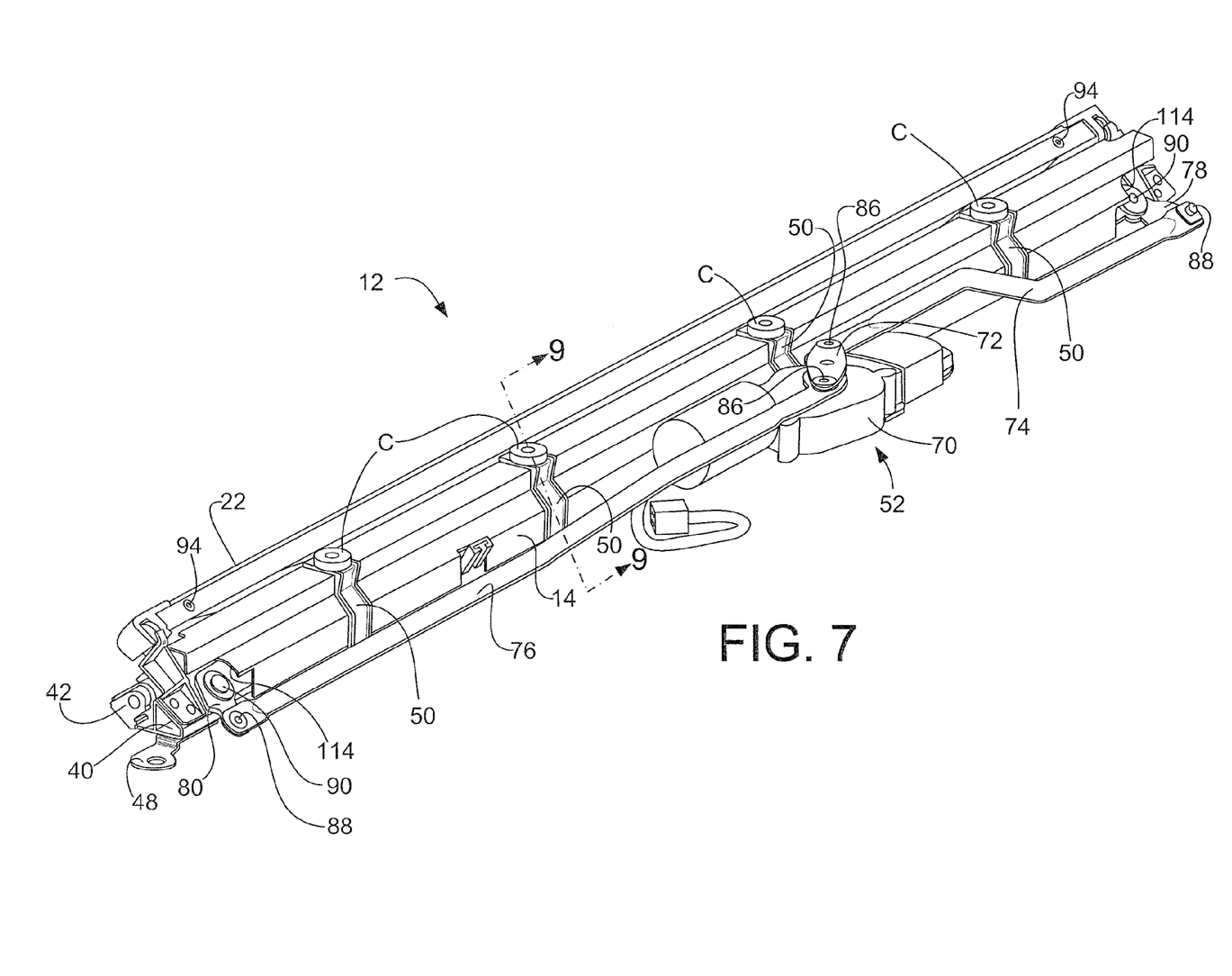
FIG. 7 is another perspective view of the sunshade assembly from a reverse angle relative to the depiction in FIG. 6, with the sunshade in the retracted position showing the close-out member in accordance with the present invention.
Figure 8:
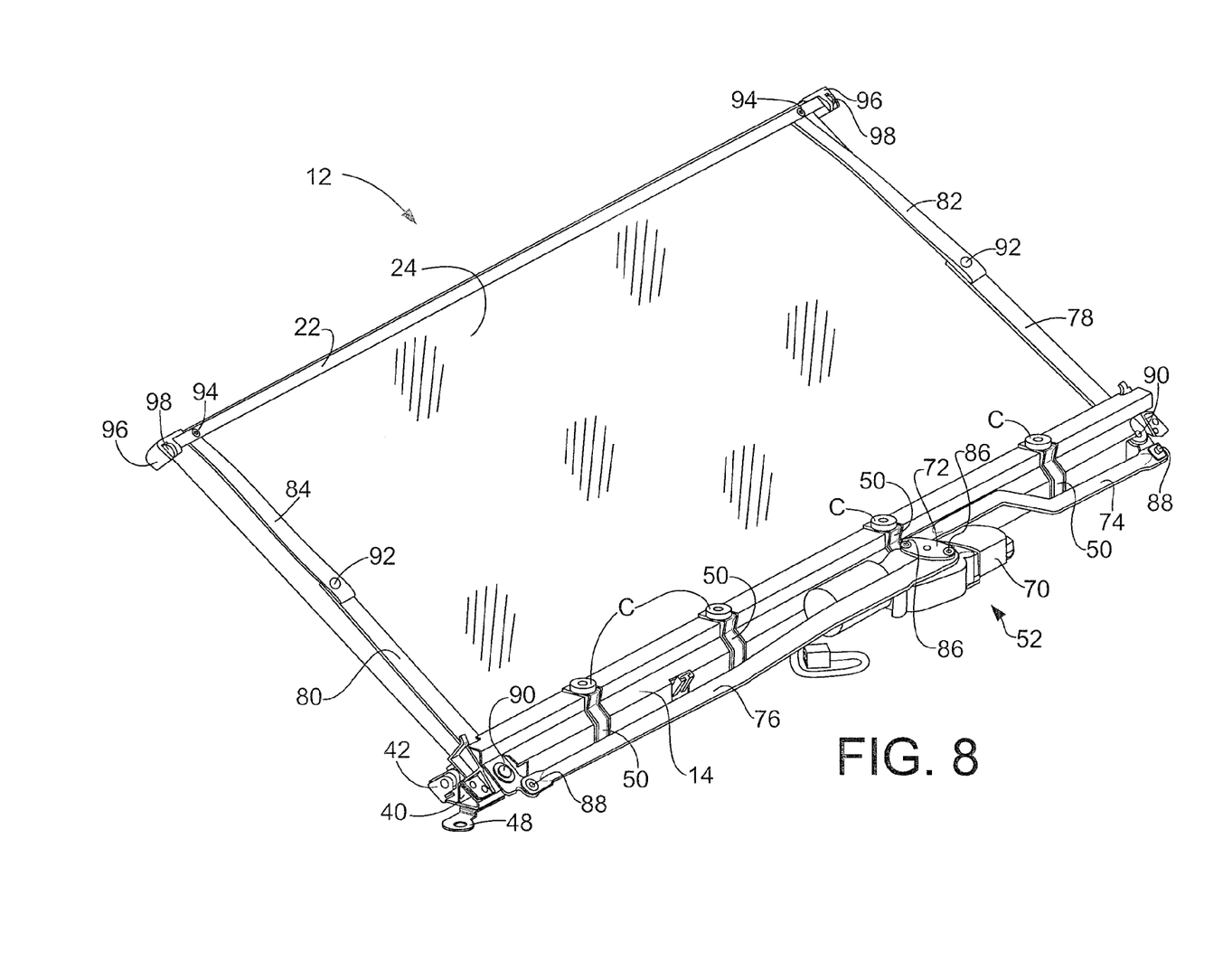
FIG. 8 is yet another perspective view of the sunshade assembly similar to FIG. 7, showing the sunshade in the extended position and also showing the close-out member in accordance with the present invention.

As shown in FIGS. 6, 7 and 8, the first attachment brackets 46 (FIG. 6) and the second attachment bracket 48 (FIGS. 7 and 8) are fixed to the lower frame member 40 and are used in a conventional manner to mount the sunshade assembly 12 using conventional fasteners. The lower frame member 40 at least partially defines a support assembly and the first and second attachment brackets 46 and 48 basically define a securing portion for attachment to the P-shelf support structure 21 (part of the vehicle structure).

The sunshade assembly 12 includes two of the spool supports 42 that are fixedly attached in a conventional manner to respective opposite ends of the lower frame member 40. The spool 44 is supported between the spool supports 42 in a conventional manner. Preferably, the spool 44 includes a conventional spring biasing mechanism (not shown) that biases the sunshade 24 toward the retracted position.

As best shown in FIGS. 9 and 10, the ribs 50 each have a contoured shape that resembles the letter C or the letter L.

Each of the ribs 50 includes a lower portion 50*a* and an upper portion 50*b*. The lower portions 50*a* of the ribs 50 are shaped to wrap around an adjacent portion of the lower frame member 40. The upper portions 50*b* of the ribs 50 are shaped to wrap part way around the close-out member 14. The ribs 50 are fixed to the lower frame member 40 by any of a variety of means. For example, if made of metal, the plurality of ribs 50 can be spot welded to the lower frame member 40 or attached using conventional fasteners. If molded from a plastic or polymer material, the ribs 50 can be fixed to the lower frame member 40 by adhesive or conventional fasteners (not shown).

As shown in FIGS. 6, 9 and 10, each of the ribs 50 has a first end 60 and a second end 62. Each of the first and second ends 60 and 62 has an attachment hole with a fastening clip C mounted thereto. As shown in FIGS. 9 and 10, the fastening elements F of the trim member 18 are fastened to the fastening clip C thus fixing the trim member 18 to the sunshade assembly 12. The trim member 18 is also provided with additional fastening elements (not shown) that extend through additional fastening clips (not shown) on the P-shelf support structure 21 thus fixing the trim member 18 to the P-shelf support structure 21.

A description of the sunshade moving mechanism 52 is now provided with reference to FIGS. 6-8. The sunshade moving mechanism 52 is supported to lower frame member 40 (the support assembly) by conventional fasteners (not shown). As best shown in FIGS. 7 and 8, the sunshade moving mechanism 52 includes a motor 70, a rotatable member 72, first links 74 and 76, second links 78 and 80 and third links 82 and 84 (FIG. 8 only).

The motor 70 is a conventional electric motor that is operable to move the sunshade 24 between the retracted position and the extended position. More specifically, the motor 70 is configured to rotate a conventional shaft (not shown) connected to the rotatable member 72. The rotatable member 72 is a motivating member that forms part of a linkage that moves the sunshade 24. The rotatable member 72 is connected to first ends of the first links 74 and 76 such that as the rotatable member 72 is rotated by the motor 70, the first links 74 and 76 are moved along the lateral length of the sunshade assembly 12. Specifically, the first links 74 and 76 pivot about pivot pins 86 that extend through respective ones of the first links 74 and 76 and opposite ends of the rotatable member 72.

Second ends of the first links 74 and 76 are pivotally connected to the second links 78 and 80. Specifically, the first links 74 and 76 pivot about pivot pins 88 that extend through respective ones of the first links 74 and 76 and the second links 78 and 80. The second links 78 and 80 are pivotally supported to the lower frame member 40 for pivoting movement about pivot pins 90. As shown in FIG. 8, distal ends of the second links 78 and 80 are pivotally connected to first ends of the third links 82 and 84 for pivotal movement about the pivot pins 92. Second ends of the third links 82 and 84 are pivotally fixed to the end piece 22. Specifically, the second ends of the third links 82 and 84 pivot about pivot pins 94, as shown in FIG. 8.

A description of the end piece 22 is now provided with reference to FIGS. 5-10. The end piece 22 is an elongated molded member that can be made of metal, plastic or polymer materials. The end piece 22 includes an outer surface that is decorated in a manner consistent with the outer surface of the trim member 18 and/or the interior of the passenger compartment P. The end piece 22 also includes end caps 96 installed at opposite lateral ends of the end piece 22. One of the end caps 96 is shown enlarged in FIG. 5. Each of the end caps 96 includes a roller 98 that can contact the rear window 16 as the sunshade 24 and the end piece 22 move between the retracted position and the extended position. As shown in FIGS. 9 and 10, the end piece 22 also includes a groove G that is dimensioned to retain one end of the sunshade 24. The groove G extends along the lateral length of the end piece 22.

As best shown in FIGS. 8, 9 and 10, the sunshade 24 is a flat flexible sheet-like member that can be made of textile or fabric, plastic or any of a variety of polymers. The sunshade 24 is rolled or wrapped around the spool 44 and can be unrolled such that the sunshade 24 is extendable to the extended position, as shown in FIG. 8. Hence, the sunshade 24 is movably supported to lower frame member 40 (and the P-shelf support structure 21) via the spool 44 and the spool supports 42 for movement between the retracted position and the extended position such that in the extended position at least a portion of the sunshade 24 extends through the slot 26 (the sunshade opening).

A description of the close-out member 14 is now provided with specific reference to FIGS. 7-10. The close-out member 14 is supported to the sunshade assembly 12 and the P-shelf support structure 21 such that the close-out member 14 conceals the P-shelf support structure 21 and other parts of the sunshade assembly 12 from view through slot 26 (the sunshade opening). More specifically, the close-out member 14 is oriented such that the close-out member 14 covers and conceals the ribs 50 and the P-shelf support structure 21 from view through the slot 26 of the trim member 18.

The close-out member 14 is further positioned such that portions of the close-out member 14 are visible through the slot 26, as indicated in FIG. 10 by the arrow A. In FIG. 10, the arrow A represents a line-of-sight of a person looking through the rear window 16 and further looking into the slot 26. The line-of-sight (arrow A) is substantially parallel to the sunshade 24, with the sunshade in the extended position, as shown in FIG. 10. In the direction of the arrow A, only the close-out member 14 and the sunshade 24 are visible through the slot 24 with the sunshade 24 in the extended position. In addition to the line-of-sight A, an angle of view α is defined between a plane defined by the sunshade 24 in the extended position (as shown in FIG. 10) and a line that intersects with the plane and extends to an upper edge of the slot 26 (the sunshade opening) as indicated in FIG. 10. Within the confines of the angle of view α, only the close-out member 14 and the sunshade 24 are visible through the slot 24 with the sunshade 24 in the extended position.

The close-out member 14 is basically an elongated molded or stamped member that is formed with a plurality of contoured sections, as best shown in FIGS. 9 and 10 in cross-section. The close-out member 14 is preferably painted a dark color (for example, black) in order to more effectively cover and hide the P-shelf support structure 21. Further, painting the close-out member 14 a dark color limits or prevents reflection of incidental light thus maintaining an attractive appearance within the vehicle 10.

The close-out member 14 includes a first section 100, a second section 102, a third section 104 and a fourth section 106. The close-out member 14 also has a visible surface 108 and a concealed surface 110. The visible surface 108 extends along each of the first, second, third and fourth sections 100, 102, 104 and 106. At least the visible surface 108 is painted or coated with a dark covering (such as black paint). The concealed surface 110 extends along an opposite side of each of the first, second, third and fourth sections 100, 102, 104 and 106.

The first section 100 and the second section 102 are perpendicular to one another. Similarly, the first section 100 and the fourth section 106 are perpendicular to one another. However, the third section 104 is disposed between the second section 102 and the fourth section 106 and is angularly offset from both the second and the fourth sections 100 and 106.

The close-out member 14 is attached to the ribs 50, as indicated in FIGS. 9 and 10. More specifically, a clamp portion 112 is dimensioned to hold the concealed surface 110 against the ribs 50. The clamp portion 112 can be a separate member removably attached to the ribs 50, or the clamp portion 112 can be formed integrally with the ribs 50 during a molding process when the ribs 50 are manufactured.

As is shown in FIGS. 9 and 10, a portion of each of the first section 100, the second section 102, the third section 104 and the fourth section 106 of the close-out member 14 contacts the ribs 50. However, each of the ribs 50 only contacts and extends along a portion of the concealed surface 100 of the close-out member 14.

As indicated in FIG. 5, the first section 100 of the close-out member 14 extends parallel to an adjacent portion of the trim member 18. The close-out member 14 also extends substantially along the lateral length of the lower frame member 40 parallel to the width of the sunshade 24

Referring again to FIG. 7, the close-out member 14 also includes recessed portions 114 at opposite ends thereof dimensioned to receive respective portions of the second links 78 and 80 of the sunshade moving mechanism.

The close-out member 14 can be made of any of a variety of materials or combination of materials. For example, the close-out member 14 can be made of metal, plastic, polymer materials, or combinations thereof combined with an outer layer of sound dampening material(s) such as textile material, foam or combinations thereof. Specifically, the close-out member 14 preferably includes a sound dampening or sound absorbing material. However, the close-out member 14 is preferably a rigid element that is non-movably attached to sunshade assembly 12.

The dimensions, shape and positioning of the close-out member 14 within the sunshade assembly 12 is such that the ribs 50, the P-shelf support structure 21 and the majority of the sunshade moving mechanism 52 are concealed and/or hidden from the view any person looking down into the slot 26 with the sunshade 24 in the extended position (for example, along the direction of view represented by the arrow A). Since the close-out member 14 can be covered with a dark textile material, painted or otherwise decorated to provide an attractive appearance, any unsightly or unattractive portions of the sunshade assembly 12 and the P-shelf support structure 21 are concealed and/or hidden from view. Further, the sunshade 24 obscures or covers other portions of the sunshade assembly 12. Together, the sunshade 24 and the close-out member 14 effectively conceal and obscure almost all elements of the sunshade assembly 12 located under the trim member 18 that might otherwise be visible through the slot 26.

The various portions of the vehicle 10, such as trim components, fenders, drive train components, etc, are conventional components that are well known in the art. Since these vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle window sunshade assembly comprising:
a vehicle structure;
a trim member being dimensioned to at least partially cover the vehicle structure, the trim member having a sunshade opening and attachment portions for coupling to the vehicle structure;
a sunshade having an end supported by the vehicle structure, the sunshade movable between a retracted position and an extended position such that in the extended position at least a portion of the sunshade extends through the sunshade opening; and
a close-out member supported by the vehicle structure and positioned such that with the trim member installed to the vehicle structure the close-out member extends generally around the end of the sunshade and downward from a lower surface of the trim member to conceal an area behind the end of the sunshade from view through the sunshade opening.

2. The vehicle window sunshade assembly of claim 1, further comprising:
a spool portion supported by the vehicle structure, the spool portion coupled to the first end of the sunshade and containing a majority of the sunshade when in the retracted position,
wherein the close-out extends generally around the spool portion.

3. The vehicle window sunshade assembly according to claim 1, wherein
the close-out member is positioned such that a portion of the close-out member is visible through the sunshade opening.

4. The vehicle window sunshade assembly according to claim 1, further comprising:
a sunshade moving mechanism supported by the vehicle structure operable to move the sunshade between the retracted position and the extended position.

5. The vehicle window sunshade assembly according to claim 4, wherein
the close-out member has lateral opposite ends having recessed portions dimensioned to receive portions of the sunshade moving mechanism.

6. The vehicle window sunshade assembly according to claim 1, wherein
the close-out member extends substantially along a lateral length of the vehicle window sunshade assembly parallel to the width of the sunshade.

7. The vehicle window sunshade assembly according to claim 1, wherein
the close-out member is a rigid element non-movably attached to the vehicle structure.

8. The vehicle window sunshade assembly according to claim 1, wherein
the close-out member has a first section and a second section that are perpendicular to one another.

9. The vehicle window sunshade assembly according to claim 8, wherein
the first section extends parallel to an adjacent portion of the trim member.

10. The vehicle window sunshade assembly of claim 1, wherein the trim member is attached to the close-out member.

11. The vehicle window sunshade assembly of claim 1, wherein the trim member is attached to the close-out member at a location that is spaced apart from opposite lateral ends of the sunshade and inward between the opposite lateral ends of the sunshade.

12. A vehicle window sunshade assembly comprising:
a vehicle structure;
a trim member being dimensioned to at least partially cover the vehicle structure, the trim member having a sunshade opening and attachment portions for coupling to the vehicle structure;
a sunshade having an end supported by the vehicle structure, the sunshade movable between a retracted position and an extended position such that in the extended position at least a portion of the sunshade extends through the sunshade opening, and such that with the sunshade in the extended position, a line-of-sight is defined substantially parallel to the sunshade looking into the sunshade opening; and
a close-out member supported by the vehicle structure and positioned such that with the trim member installed to the vehicle structure the close-out member extends generally around the end of the sunshade to conceal an area behind the end of the sunshade from view through the sunshade opening, the close-out member being dimensioned and shaped such that with the sunshade in the extended position the close-out member completely conceals an area behind the sunshade between the vehicle structure and the trim member that would otherwise be visible along the line-of-sight, wherein the close-out member is a rigid element non-movably attached to the vehicle structure.

13. The vehicle window sunshade assembly of claim 12, wherein the close-out member is further dimensioned and shaped such that with the sunshade in the extended position the close-out member completely conceals an area behind the sunshade between the vehicle structure and the trim member that would otherwise be visible along an angle of view that extends between a plane defined along the sunshade in the extended position and a line intersecting the plane and extending through the sunshade opening.

14. The vehicle window sunshade assembly of claim 12, further comprising:
a spool portion supported by the vehicle structure, the spool portion coupled to the first end of the sunshade and containing a majority of the sunshade when in the retracted position,
wherein the close-out extends generally around the spool portion.

15. The vehicle window sunshade assembly according to claim 12, further comprising:
a sunshade moving mechanism supported by the vehicle structure operable to move the sunshade between the retracted position and the extended position.

16. The vehicle window sunshade assembly according to claim 15, wherein
the close-out member has lateral opposite ends having recessed portions dimensioned to receive portions of the sunshade moving mechanism.

17. The vehicle window sunshade assembly according to claim 12, wherein
the close-out member extends substantially along a lateral length of the vehicle window sunshade assembly parallel to the width of the sunshade.

18. The vehicle window sunshade assembly according to claim 12, wherein
the close-out member has a first section and a second section that are perpendicular to one another.

19. The vehicle window sunshade assembly according to claim 18, wherein
the first section extends parallel to an adjacent portion of the trim member.

* * * * *